United States Patent
Nasu et al.

(10) Patent No.: US 10,833,924 B2
(45) Date of Patent: Nov. 10, 2020

(54) DATA COLLECTING APPARATUS, DATA COLLECTING METHOD, AND PROGRAM

(71) Applicant: Mitsubishi Electric Corporation, Tokyo (JP)

(72) Inventors: Osamu Nasu, Tokyo (JP); Yusuke Matsushita, Aichi (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/339,378

(22) PCT Filed: Nov. 6, 2017

(86) PCT No.: PCT/JP2017/040003
§ 371 (c)(1),
(2) Date: Apr. 4, 2019

(87) PCT Pub. No.: WO2019/087409
PCT Pub. Date: May 9, 2019

(65) Prior Publication Data
US 2019/0363932 A1 Nov. 28, 2019

(51) Int. Cl.
*H04L 12/24* (2006.01)
*H04L 29/08* (2006.01)
*G05B 19/05* (2006.01)

(52) U.S. Cl.
CPC .......... *H04L 41/0803* (2013.01); *H04L 67/12* (2013.01); *G05B 19/058* (2013.01); *G05B 2219/1214* (2013.01); *H04L 41/22* (2013.01)

(58) Field of Classification Search
None
See application file for complete search history.

(56) References Cited

U.S. PATENT DOCUMENTS 8,417,815 B2 * 4/2013 Yokoyama .......... H04L 41/0893
709/225
8,849,732 B2 * 9/2014 Raileanu ................ G06Q 50/28
706/12
(Continued)

FOREIGN PATENT DOCUMENTS

JP 2000-270384 A 9/2000
JP 2005-327237 A 11/2005
(Continued)

OTHER PUBLICATIONS

Decision to Grant a Patent received for Japanese Patent Application No. 2018-533950, dated Aug. 28, 2018, 6 pages including English Translation.
(Continued)

*Primary Examiner* — Backhean Tiv
(74) *Attorney, Agent, or Firm* — Xsensus LLP

(57) ABSTRACT

A data collecting apparatus (10) is connected to a device (20) via a network (31, 32), and includes a collector (142, 142), a communication controller (130), and a process execution controller (110). The collector (141, 142) collects data from the device (20) based on collection setting information, converts format of the data collected, and outputs the data whose format is converted. The communication controller (130) manages an addition of the collector (141, 142), provides the collection setting information to the collector (141, 142), and outputs data collected by the collector (141, 142). The process execution controller (110) manages processing of data outputted from the communication controller (130). The collector (141, 142) is provided as plug-in software (121, 122) containing information regarding a parameter setting item for when data is collected. The collection setting information is information in which a
(Continued)

setting value is added with respect to the parameter setting item.

9 Claims, 15 Drawing Sheets

(56) References Cited

U.S. PATENT DOCUMENTS

| | | | | |
|---|---|---|---|---|
| 9,262,559 | B2* | 2/2016 | Mewes | G06Q 10/0639 |
| 10,216,485 | B2* | 2/2019 | Misra | G06F 8/60 |
| 2003/0023518 | A1* | 1/2003 | Spriggs | G06Q 10/087 |
| | | | | 705/28 |
| 2003/0061403 | A1* | 3/2003 | Miyata | G06F 9/4415 |
| | | | | 719/328 |
| 2004/0230328 | A1* | 11/2004 | Armstrong | G05B 23/0267 |
| | | | | 700/83 |
| 2005/0091361 | A1* | 4/2005 | Bernstein | H04L 41/12 |
| | | | | 709/223 |
| 2005/0144271 | A1* | 6/2005 | Shirane | H04L 67/303 |
| | | | | 709/223 |
| 2005/0222810 | A1* | 10/2005 | Buford | H04L 41/0631 |
| | | | | 702/183 |
| 2009/0015422 | A1* | 1/2009 | Sixt, Jr. | G07C 3/00 |
| | | | | 340/679 |
| 2009/0300173 | A1* | 12/2009 | Bakman | H04L 41/147 |
| | | | | 709/224 |
| 2010/0131618 | A1* | 5/2010 | Brewis | H04L 41/0856 |
| | | | | 709/220 |
| 2011/0035187 | A1* | 2/2011 | Dejori | G01D 9/005 |
| | | | | 702/187 |
| 2012/0310599 | A1* | 12/2012 | Tanaka | A01B 79/005 |
| | | | | 702/189 |
| 2013/0124309 | A1* | 5/2013 | Traasdahl | G06F 9/5027 |
| | | | | 705/14.49 |
| 2013/0144863 | A1* | 6/2013 | Mayer | G06F 16/951 |
| | | | | 707/711 |
| 2014/0250153 | A1* | 9/2014 | Nixon | G05B 15/02 |
| | | | | 707/812 |
| 2015/0088442 | A1* | 3/2015 | Farrar | G01R 21/1333 |
| | | | | 702/62 |
| 2015/0341212 | A1* | 11/2015 | Hsiao | G06F 3/0482 |
| | | | | 715/735 |
| 2015/0341981 | A1* | 11/2015 | Gallo | G06F 3/04847 |
| | | | | 702/188 |
| 2016/0072894 | A1* | 3/2016 | Mishra | H04L 41/5054 |
| | | | | 709/226 |

FOREIGN PATENT DOCUMENTS

| | | |
|---|---|---|
| JP | 2006527426 A | 11/2006 |
| JP | 2009-300186 A | 12/2009 |
| JP | 2014170552 A | 9/2014 |
| JP | 2016-130873 A | 7/2016 |
| WO | 2004086160 A1 | 10/2004 |
| WO | 2006/017796 A2 | 2/2006 |
| WO | 2016/157482 A1 | 10/2016 |

OTHER PUBLICATIONS

International Search Report dated Apr. 3, 2018 for PCT/JP2017/040003 filed on Nov. 6, 2017, 5 pages including English Translation.

Office Action issued in Taiwanese Application 107129114 dated Oct. 30, 2019.

Chinese Office Action dated Mar. 6, 2020, in Chinese patent application No. 201780076065.6.

Office Action dated Apr. 23, 2020, issued for the corresponding DE patent application No. 112017005727.2 and the English translation.

* cited by examiner

FIG.9

Input of Collection Setting Information

Selected collector:

Developer
    Vendor A
Collector name
    CC-Link IE Field
    network data collector
Version
    1.01

Real-time collection    Supported
On-demand reading    Supported
On-demand writing    Not supported Collection target:
Target specification method:
[Address specification ▼]
Target:
[A1, A2]

Collection time interval:
[100] [ms ▼]

[OK]  [CANCEL]

FIG.11

| COLLECTION SETTING INFORMATION | | | |
|---|---|---|---|
| COLLECTOR IDENTIFICATION NUMBER | COMMUNICATION STANDARD | COLLECTION TARGET | COLLECTION TIME INTERVAL |
| 141 | CC-Link IE | DEVICE ADDRESS A1, A2 | 1ms |
| 142 | Ethernet/IP | SENSOR OUTPUT | 100μsec |
| 143 | SLMP | OPERATION STATE OF ROBOT | 100ms |

DATA COLLECTING APPARATUS, DATA COLLECTING METHOD, AND PROGRAM

CROSS-REFERENCE TO RELATED APPLICATIONS

The present application is based on PCT filing PCT/JP2017/040003, filed Nov. 6, 2017, the entire contents of which are incorporated herein by reference.

TECHNICAL FIELD

The present disclosure relates to a data collecting apparatus, a data collecting method, and a program.

BACKGROUND ART

As typified by a factory, there are cases in which numerous devices are connected together via a network, and a system that processes data in real-time is established. In such a system, data collection via numerous types of networks is becoming more and more prevalent due to advancements in factory automation.

The collection of data in the aforementioned system is realized by using drivers that support each of the numerous types of networks. However, the task of creating a program for collecting and processing data by running drivers that support each of the numerous types of networks is a complicated one. Therefore, conceivably, a program for running the drivers is arranged in advance and data is collected using profile data as is disclosed in Patent Literature 1.

CITATION LIST

Patent Literature

Patent Literature 1: Unexamined Japanese Patent Application Kokai Publication No. 2005-327237

SUMMARY OF INVENTION

Technical Problem

Patent Literature 1 discloses a configuration in which a programmable logic controller (PLC) collects data from a sensor and an I/O via a field bus and reports via a cell network to a cell controller. Here, compatibility with a network is determined based on profile data prepared for each device, thereby facilitating a task of setting a network.

However, for the PLC of Patent Literature 1, a communication unit must be provided for each type of field bus. Therefore, there is risk of the setting task for collecting data becoming complicated due to having to add a communication unit in order to accommodate a new field bus in addition to preparing, in accordance with the adding of the communication unit, profile data in conformity with a pre-specified format.

In consideration of the aforementioned circumstances, an objective of the present disclosure is to facilitate the setting task for collecting data.

In order to achieve the aforementioned objective, a data collecting apparatus of the present disclosure is a data collecting apparatus that is to be connected to a device via a network, and includes: collection means for collecting data based on collection setting information from the device connected via the network, converting a format of the data collected, and outputting the data whose format is converted; communication control means for managing an addition of the collection means, providing the collection setting information to the collection means, and outputting the data collected by the collection means; and process execution control means for managing processing of the data outputted by the communication control means, wherein the collection means is provided as plug-in software containing information regarding a parameter setting item for when data is collected from the device connected via the network, and the collection setting information is information in which a setting value is added with respect to the parameter setting item.

Advantageous Effects of Invention

According to the present disclosure, the setting task for collecting data can be facilitated.

BRIEF DESCRIPTION OF DRAWINGS

FIG. 9 is a diagram illustrating an example of an input screen;

FIG. 11 is a diagram illustrating an example of the collection setting information;

DESCRIPTION OF EMBODIMENTS

Embodiments of the present disclosure are described below in reference to the drawings.

Embodiments

Figure 1:
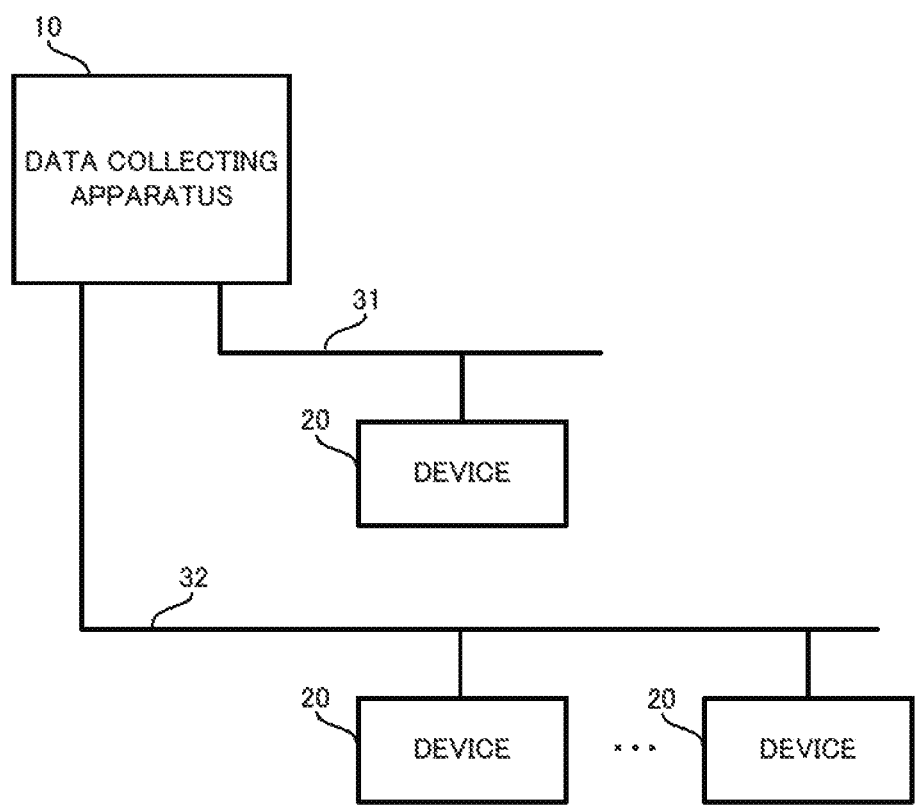
FIG. 1 is a block diagram of a system including a data collecting apparatus according to an embodiment of the present disclosure.

A data collecting apparatus 10 according to the present embodiment is a computer apparatus that is installed in a factory. The data collecting apparatus 10, as illustrated in FIG. 1, is connected to devices 20 via a first network 31 and a second network 32, and collects data transmitted by the devices 20 in these networks. By using the data collecting apparatus 10, data transmitted in the networks can be easily collected. The data collected by the data collecting apparatus 10, for example, is analyzed, processed, and then used as production management information, or is used for monitoring an operation state of a factory. The collected data is not limited to these examples of usage. The collected data may be freely utilized by a user of the data collecting apparatus 10.

The first network 31 and the second network 32, for example, are networks for realizing real-time control, monitoring, and management, as typified by CC-Link IE, Ethernet/IP, PROFINET, and the like. However, the first network 31 and the second network 32 are not limited to these networks. Other networks may be used. Also, the device 20, for example, is a controller as typified by a PLC, an actuator, a driver that drives the actuator, a machine tool, a sensor, a robot, or another kind of device. Also, the quantity of devices that are connected to each of the first network 31 and the second network 32 and communicate with the data collecting apparatus 10 may be one or may be more than one.

Figure 2:
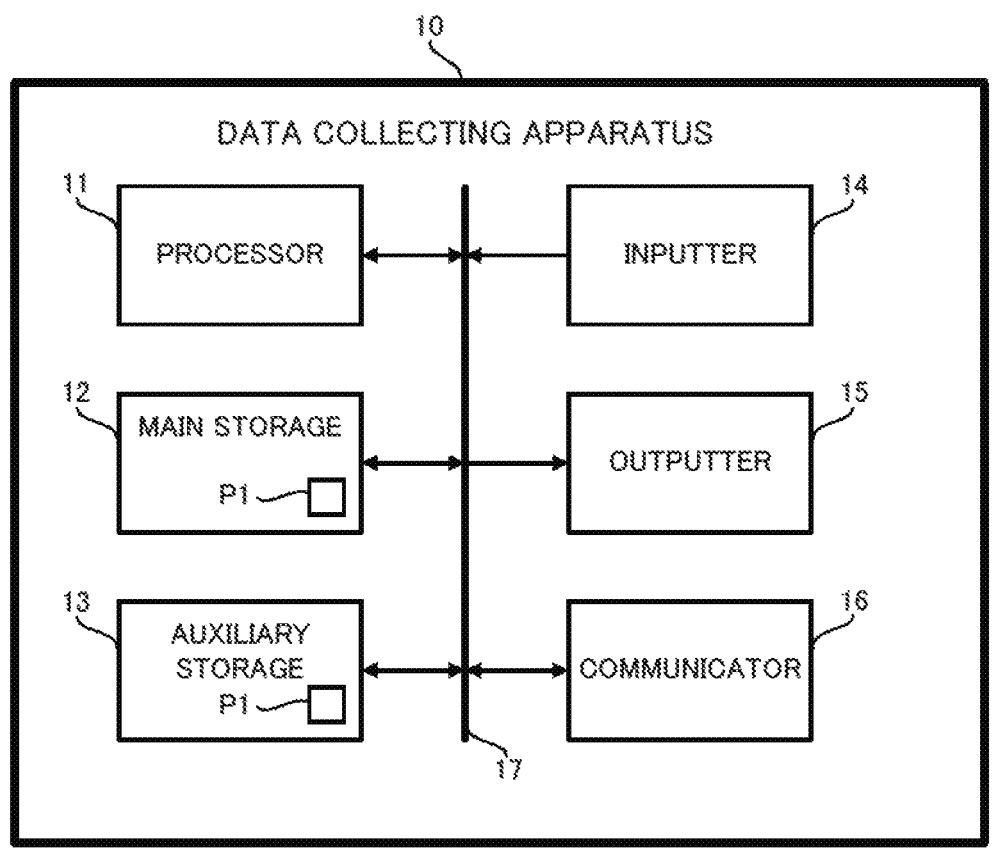
FIG. 2 is a diagram illustrating a hardware configuration of the data collecting apparatus.

As illustrated in FIG. 2, the data collecting apparatus 10 includes, as hardware components, a processor 11, a main storage 12, an auxiliary storage 13, an inputter 14, an outputter 15, and a communicator 16. The main storage 12, the auxiliary storage 13, the inputter 14, the outputter 15, and the communicator 16 are connected to the processor 11 through an internal bus 17.

The processor 11 includes a central processing unit (CPU) or a micro processing unit (MPU). By executing a program P1 that is stored in the auxiliary storage 13, the processor 11 achieves various functions and executes processing described further below.

The main storage 12 includes a random access memory (RAM). The program P1 is loaded from the auxiliary storage 13 into the main storage 12. Then, the main storage 12 is used as a working area of the processor 11.

The auxiliary storage 13 includes a non-volatile memory as typified by a hard disk drive and flash memory. The auxiliary storage 13 stores, in addition to the program P1, various types of data used for processing by the processor 11. The auxiliary storage 13 provides the processor 11 with data that is used by the processor 11 and stores data that is provided by the processor 11, in accordance with instructions by the processor 11.

The inputter 14 includes an inputting device as typified by an input key and pointing device. The inputter 14 acquires information inputted by the user of the data collecting apparatus 10 and notifies of the acquired information to the processor 11.

The outputter 15 includes an output device as typified by a liquid crystal display (LCD) and speakers. The outputter 15 presents the user of the data collecting apparatus 10 with various types of information in accordance with an instruction by the processor 11.

The communicator 16 includes a network interface controller (NIC) for communicating with external devices. The communicator 16 receives a signal from an external device and outputs data included in the signal to the processor 11. Also, the communicator 16 transmits to the external device a signal indicating data outputted by the processor 11.

Figure 3:
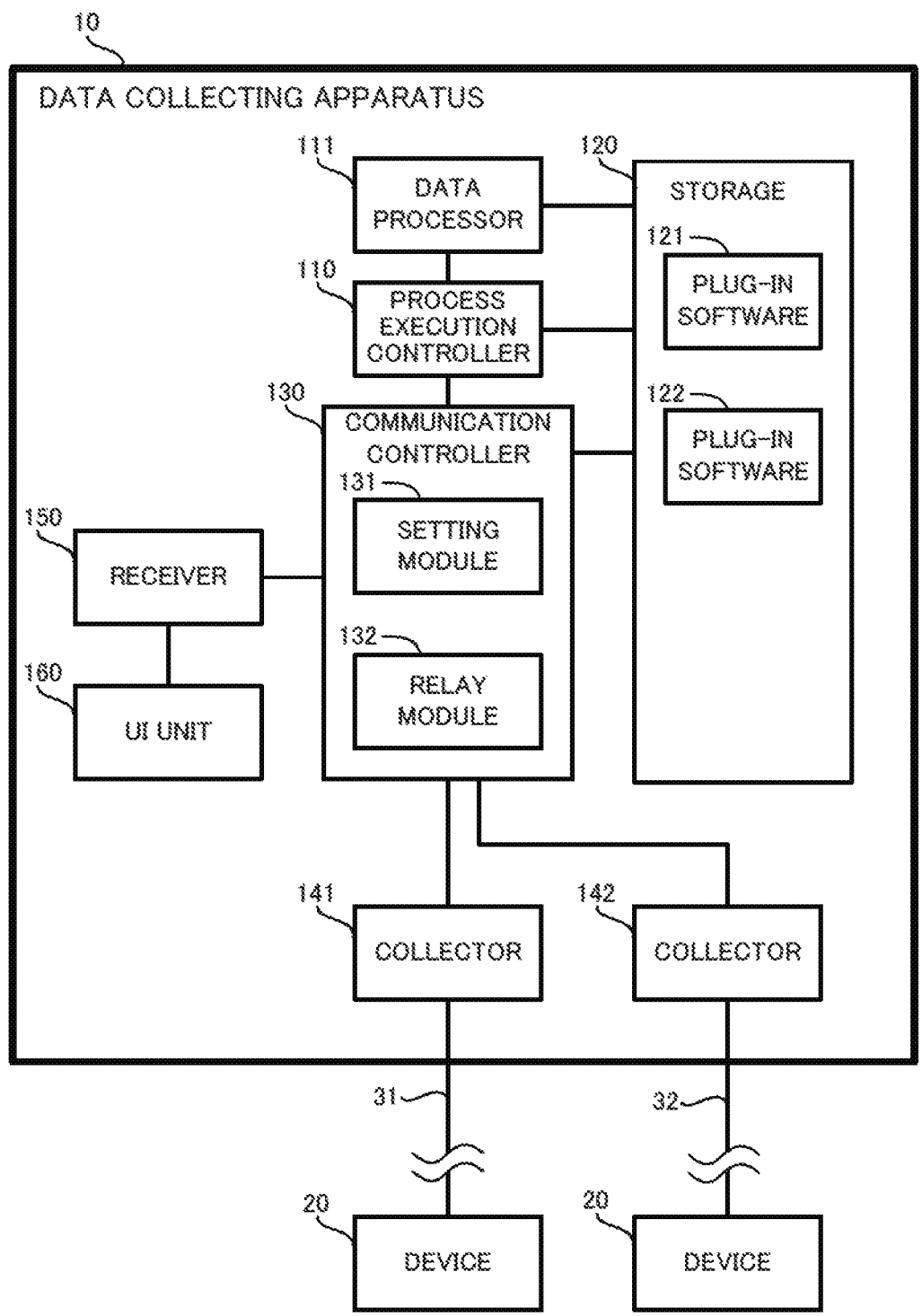
FIG. 3 is a diagram illustrating a functional configuration of the data collecting apparatus according to an embodiment.

The data collecting apparatus 10 achieves various functions through cooperation between the hardware components illustrated in FIG. 2. The data collecting apparatus 10, as illustrated in FIG. 3, includes as the functions, a process execution controller 110 that manages processing of data collected from the first network 31 and the second network 32, a data processor 111 that processes the collected data in accordance with an instruction of the process execution controller 110, a storage 120 that stores various types of data, a communication controller 130 that controls communication by the data collecting apparatus 10, a collector 141 that collects data that is transmitted in the first network 31, a collector 142 that collects data that is transmitted in the second network 32, a receiver 150 that receives information to be set in the collectors 141 and 142, and a user interface (UI) unit 160 for the user to input information.

The process execution controller 110 is realized mainly by the processor 11. The process execution controller 110 causes the data processor 111 to execute processing of, for example, organizing, diagnosis, analysis, and storing of the collected data. Also, the process execution controller 110 acquires a processing result from the data processor 111 and outputs information indicating the processing result. Examples of output by the process execution controller 110 include storing of information into the storage 120, notification of information for displaying a screen on the UI unit 160, and transmission of the processing result via the first network 31, the second network 32, or a non-illustrated network. The process execution controller 110 functions as process execution control means in the claims, yet this is to be taken in a non-limiting sense.

Here, management of processing of data by the process execution controller 110 includes determining at least one of (i) content of processing performed on the data or (ii) a unit that performs processing on the data. Although the data processor 111 in the present embodiment processes data, another unit may process the data, as described further below. Furthermore, management of the processing of the data by the process execution controller 110 includes the management of various conditions including the start time and end time for the performing of processing on the data as well as the order at which processing is performed. In other words, the process execution controller 110 is a unit that controls the execution of processing that is performed on the collected data.

The data processor 111 is realized mainly by the processor 11. The data processor 111 acquires the collected data from the process execution controller 110 in accordance with the instructions from process execution controller 110, and subsequently processes this data. Then, the data processor 111 outputs the information indicating the data processing result to the process execution controller 110.

The storage 120 is realized mainly by the auxiliary storage 13. The data stored in the storage 120 includes the plug-in software 121 and 122. The plug-in software 121 and 122 corresponds to a portion of the program P1 (see FIG. 2). The plug-in software 121 is a program module for causing the processor 11 to function as the collector 141. The plug-in software 122 is a program module for causing the processor 11 to function as the collector 142. More specifically, the plug-in software 121 and 122 are stored in the storage 120 as a dynamic link library. Although the plug-in software 121 and 122 are stored in the storage 120 in an initial state such as when the data collecting apparatus 10 is manufactured, after the manufacturing of the data collecting apparatus 10, the plug-in software 121 and 122 may be replaced by or may be modified by the user of the data collecting apparatus 10. Also, new plug-in software may be added by the user.

Therefore, the collectors 141 and 142 serve as components that are respectively provided as plug-in software 121 and 122.

The communication controller 130 is realized mainly by the processor 11. The communication controller 130 manages the collecting of data by the data collecting apparatus 10. Specifically, the communication controller 130 starts up the collectors 141 and 142 by respectively loading the plug-in software 121 and 122. In other words, the communication controller 130 manages the adding of the collectors 141 and 142. Also, the communication controller 130 includes a setting module 131 and a relay module 132. The setting module 131 acquires, from the receiver 150, information necessary for the collection of data by the collectors 141 and 142, and sets the collectors 141 and 142. The relay module 132 functions as an interface for relaying transmissions of data between the process execution controller 110 and the collectors 141 and 142 and for connecting the collectors 141 and 142 with the process execution controller 110. The relay module 132 acquires, from the collectors 141 and 142, data collected by the collectors 141 and 142, and sends the data as necessary to the process execution controller 110. The communication controller 130 functions as communication control means in the claims, yet this is to be taken in a non-limiting sense.

The collectors 141 and 142 are realized mainly by the processor 11 and the communicator 16. The collectors 141 and 142 collect data based on pre-set collection setting information. The collection setting information includes, for example, information regarding a network through which data is collected, information indicating collection target data, and a collection time interval. The information regarding the network is, for example, a communication mode and a parameter necessary for communication using the communication mode. Also, the collection target data refers to information indicating a device that is to transmit the collected data, a type of collected data, a time at which data is collected, or a range of values. Also, the collection time interval is, for example, 100 µs, 1 ms, or 10 ms. The collectors 141 and 142 respectively convert data of a format that conforms to a communication standard of the first network 31 and data of a format that conforms to a communication standard of the second network 32 into data of a common format and then outputs the data converted into a common format to the communication controller 130. Furthermore, the collector 141 and the collector 142 each have a function for providing setting support information for the setting of the collection setting information by the user. The details of the setting support information are described further below. The collectors 141 and 142 function as collection means in the claims, yet this is to be taken in a non-limiting sense.

The receiver 150 is realized mainly by the processor 11. Upon selection by the user of one collector from among the collectors 141 and 142, the receiver 150 acquires, via the communication controller 130, setting support information that is provided from the one selected collector. The receiver 150 generates, based on the setting support information acquired from the collectors 141 and 142 that are respectively realized by the plug-in software 121 and 122, screen information indicating an input screen for inputting collection setting information. Then, after the outputting of the generated screen information to the UI unit 160, the receiver 150 receives collection setting information inputted by the user from the UI unit 160, and notifies of the inputted collection setting information to the setting module 131 of the communication controller 130. The receiver 150 functions as receiving means in the claims, yet this is to be taken in a non-limiting sense.

The UI unit 160 is realized mainly by the inputter 14 and the outputter 15. The UI unit 160 displays an input screen for the user in accordance with screen information outputted by the receiver 150. Then, the UI unit 160 notifies of the inputted collection setting information to the receiver 150. The UI unit 160 may be a touchscreen in which the inputter 14 and the outputter 15 are integrally formed and may be realized by the outputter 15 as an LCD and the inputter 14 as an input keys formed separately from this outputter 15.

Figure 4:
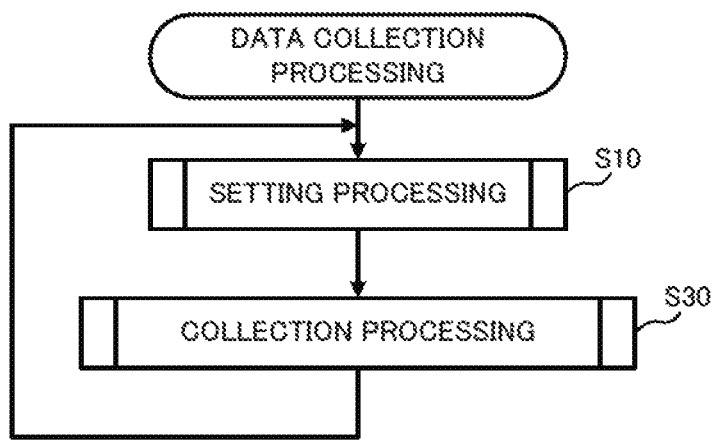
FIG. 4 is a flowchart of data collection processing that is executed by the data collecting apparatus according to an embodiment.

Next, processing that is executed by the data collecting apparatus 10 is described in detail with reference to FIGS. 4 to 10. As illustrated in FIG. 4, upon starting of the data collection processing, the data collecting apparatus 10 alternatingly executes setting processing in which the collection setting information is set (step S10) and collection processing in which the data is collected and processed (step S30). Next, the setting processing and the collection processing are described in order.

Figure 5:
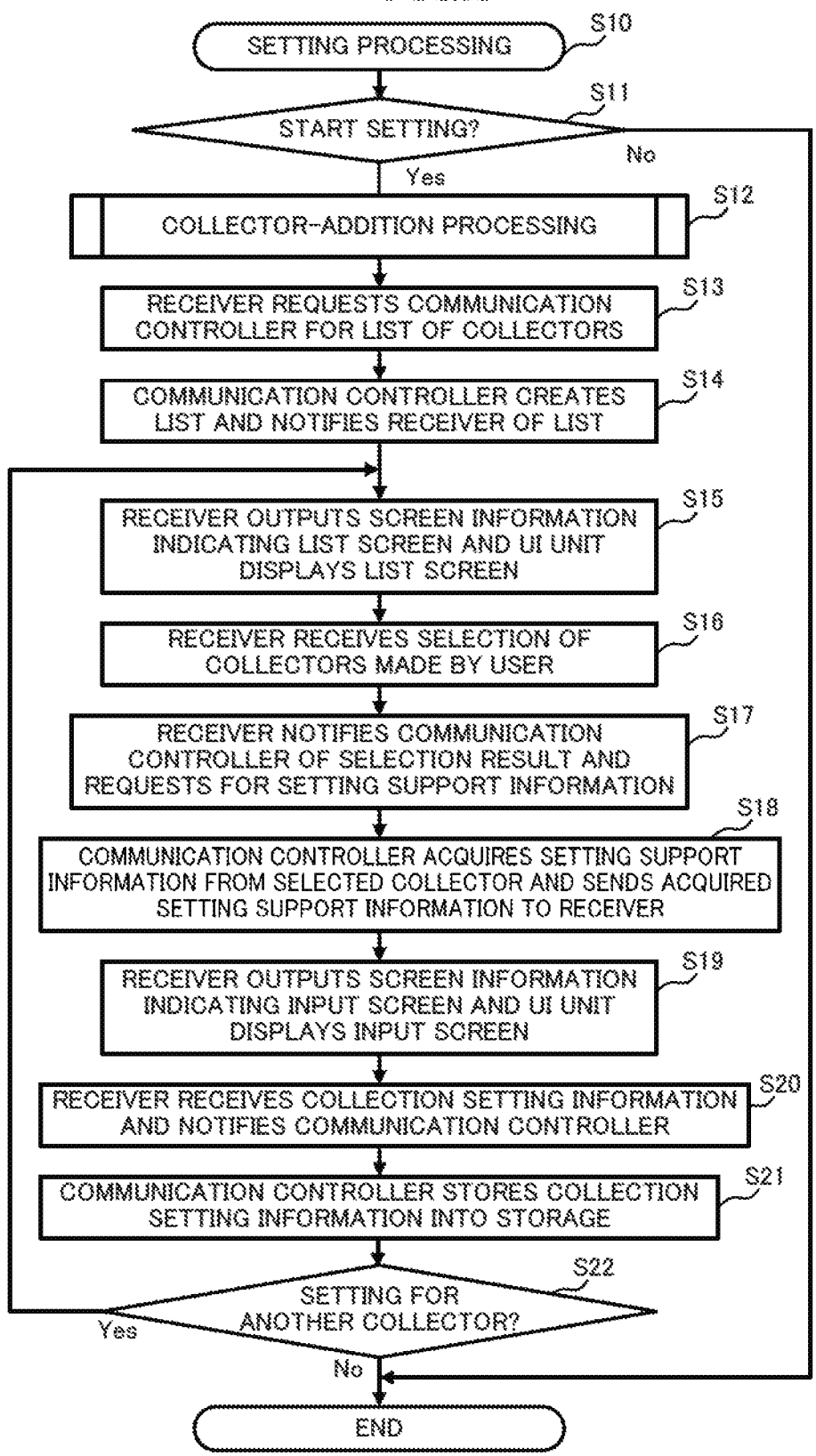
FIG. 5 is a flowchart of setting processing that is included in the data collection processing of FIG. 4.

In the setting processing, the data collecting apparatus 10, as illustrated in FIG. 5, determines whether or not setting has started (step S11). Specifically, the receiver 150 determines whether or not an input instructing the start of setting is made by the user via the UI unit 160. If a determination is made that the setting has not started (NO in step S11), the data collecting apparatus 10 ends the setting processing.

Figure 6:
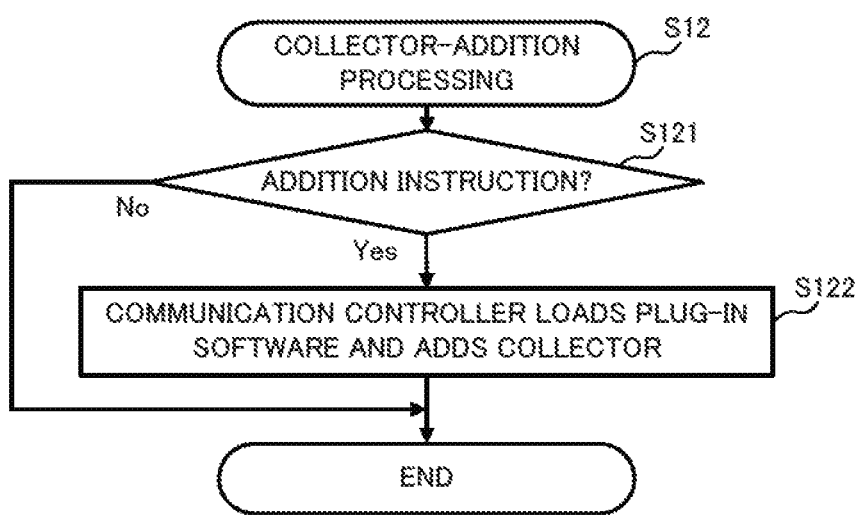
FIG. 6 is a flowchart of collector-addition processing that is included in the data collection processing of FIG. 5, the collector-addition processing being processing for adding a collector.

Conversely, if a determination is made that the setting has begun (YES in step S11), the data collecting apparatus 10 executes collector-addition processing (step S12). In the collector-addition processing, as illustrated in FIG. 6, the receiver 150 determines whether or not there is an instruction indicating that a collector 140 is to be added (step S121). Specifically, the receiver 150 determines whether or not a user made an instruction, via the UI unit 160, indicating that a collector 140 is to be added for collecting data from a new network. Here, the collector 140 is a general term that encompasses the collectors 141 and 142 and another collector 143 that is to be added and is described further below. If a determination is made that there is no adding instruction (NO in step S121), the collector 140 ends the collector-addition processing without adding the collector 140.

Figure 7:
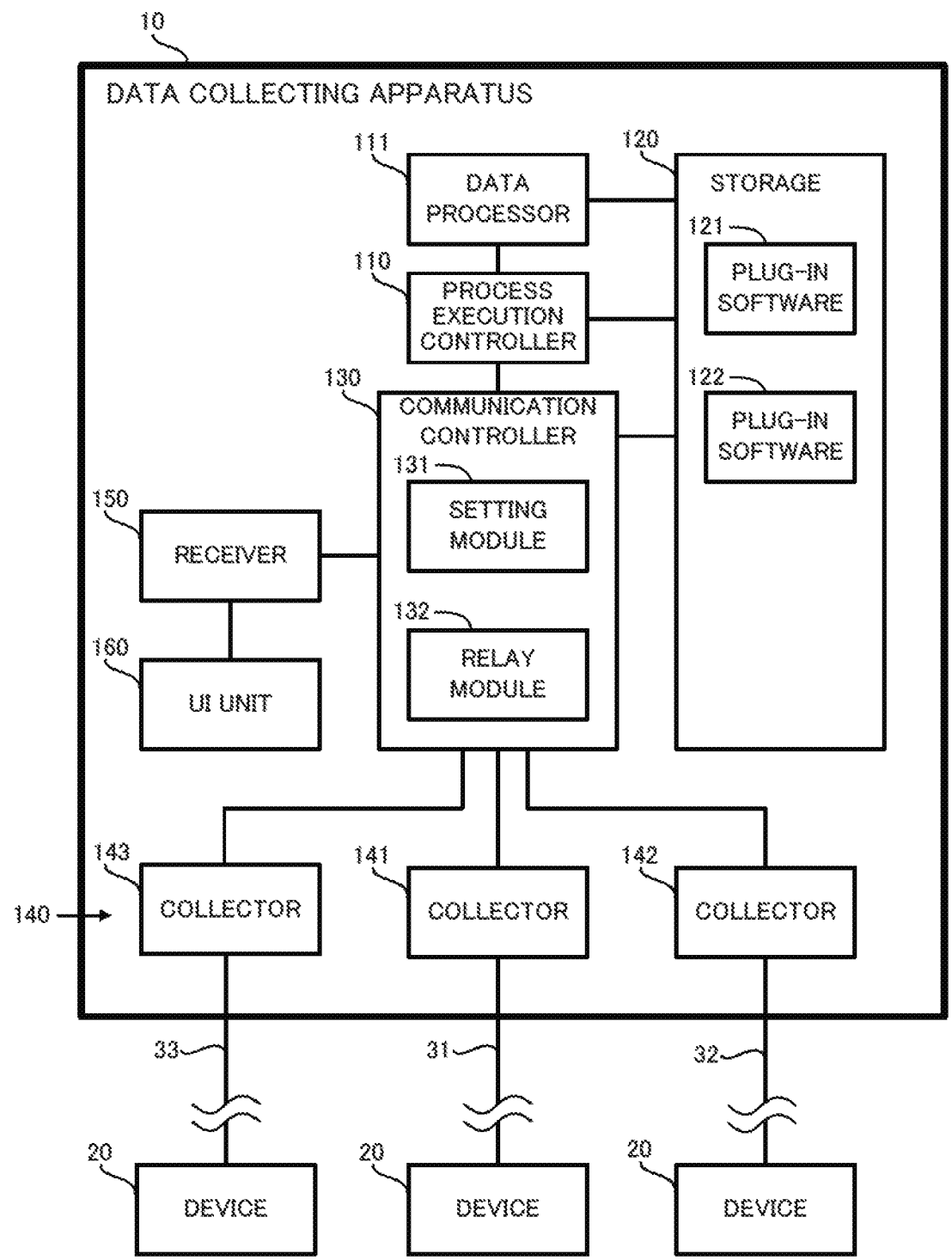
FIG. 7 is a diagram illustrating a state in which a collectors is added.

Conversely, if a determination is made that there is an adding instruction (YES in step S121), the communication controller 130 loads the plug-in software 121 or 122 or another plug-in software specified by the user and adds the collector 140 (step S122). In doing so, the collector 143 that collects data transmitted in a third network 33 is added to the data collecting apparatus 10 as illustrated in FIG. 7, for example. Subsequently, the collector-addition processing ends.

Referring back to FIG. 5, after the collector-addition processing ends (step S12), the receiver 150 requests the communication controller 130 for a list of the collectors 140 (step S13). The communication controller 130 that is managing the collectors 140 receives this request, creates a list of the collectors 140, and notifies of this list to the receiver 150 (step S14).

Figure 8:
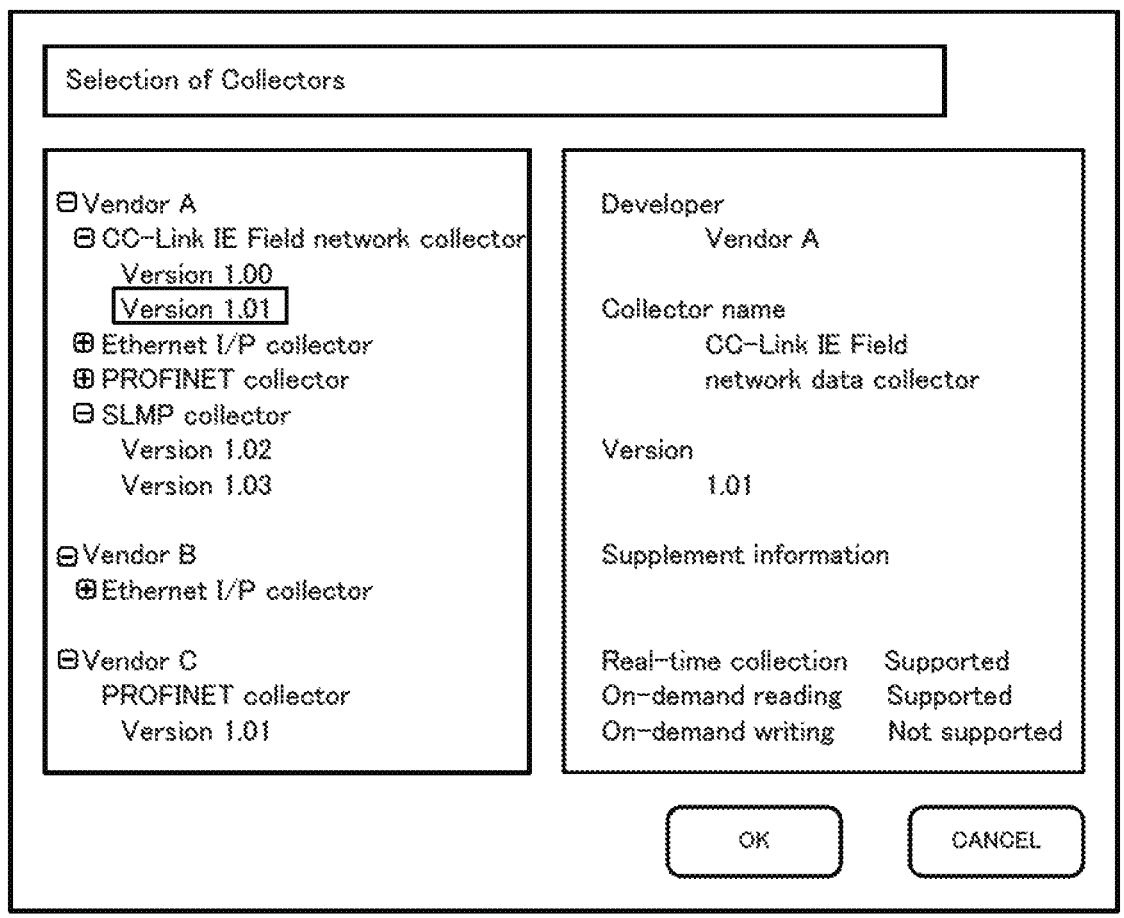
FIG. 8 is a diagram illustrating an example of a list screen.

Next, the receiver 150 outputs, to the UI unit 160, screen information for generating a list screen that presents the list of the collectors 140 to the user, and then the UI unit 160 displays the list screen (step S15). This list screen, as illustrated in FIG. 8, is displayed as a screen for selection of the collector 140 from the list. FIG. 8 illustrates a list of four types of collectors provided by vendor A, one type of collector provided by vendor B, and one type of collector provided by vendor C. Also, Version 1.01 of "CC-Link IE Field network collector" provided by vendor A is selected by a person viewing the screen and the details of the selected collector are displayed on the right side of the screen. The person viewing the screen can finalize the selection of the currently selected collector by selecting the "OK" button.

Referring back to FIG. 5, after step S15, the receiver 150 receives the selection of the collector 140 made by the user (step S16). Specifically, the receiver 150 acquires an identification number indicating the collector 140 selected by the user.

Next, the receiver 150 notifies of the selection result to the communication controller 130, and requests the communication controller 130 for setting support information which is for setting collection setting information of the selected collector 140. (step S17). Specifically, the receiver 150 notifies the communication controller 130 of the identification number and requests for setting support information of the collector 140 to which this identification number is assigned.

The communication controller 130 that received this request acquires setting support information from the selected collector 140 and sends the acquired setting support information to the receiver 150 (step S18). The setting support information according to the present embodiment is screen configuration information indicating a configuration of an input screen for inputting collection setting information. This screen configuration information may be information that associates (i) icons, buttons, text data, as well as selections and textboxes for inputting of information by the user together with (ii) data indicating their respective on-screen positions. Also, the screen configuration information may include data indicating a flow for transitioning to different screens in accordance with information inputted by the user. Furthermore, the screen configuration information may include advice to the user and a value conversion tool. The value conversion tool, for example, is used by the user for converting a hexadecimal value into a decimal value and inputting the result into the input field. The setting support information may be stored in the storage 120 as part of the plug-in software, may be newly generated by the collector 140, or may be information that is acquired by the collector 140 from outside of the data collecting apparatus 10.

Next, the receiver 150 generates screen information indicating an input screen, based on the setting support information, and outputs the generated screen information to the UI unit 160, and the UI unit 160, in turn, displays the input screen (step S19). FIG. 9 illustrates an example of the input screen. Within the pane on the left side of FIG. 9, the information of the collector selected by the user is displayed, and within the pane on the right side, the boxes for inputting of the collection setting information by the user are displayed. The user selects the "target specification method" and "unit" within the pane on the right side of FIG. 9 from the respective pull-down menus. FIG. 9 illustrates setting collection setting information containing details indicating that data transmitted, from devices whose addresses are A1 and A2, are collected at 100 ms time intervals.

As illustrated in FIG. 9, in the input screen, parameter values regarding the device that is to collect data and the network are set for various items. Hereinafter, the items used for setting parameters are referred to as parameter setting items. The collection setting information is set once the setting values for the parameter setting items are added by the user. Here, since the parameter setting items are included in the screen configuration information, the parameter setting items are included in the setting support information. Also, since the collector 140 is configured to include a function for providing this setting support information, the plug-in software is developed as software that includes information regarding the parameter setting items.

Referring back to FIG. 5, after step S19, the receiver 150 receives, from the UI unit 160, collection setting information inputted by the user using the UI unit 160, and notifies the communication controller 130 of the inputted collection setting information and the identification number (step S20). This identification number is equivalent to an identification number of the collector 140 selected in step S16. Next, the communication controller 130 stores the notified collection setting information into the storage 120 (step S21). Upon doing so, the setting of the collector 140 selected by the user to the data collecting apparatus 10 is completed. The notifying of the collection setting information from the receiver 150 to the communication controller 130 may be carried out via the process execution controller 110.

Next, the receiver 150 determines whether or not there is an instruction for the setting of another collector 140 (step S22). Specifically, the receiver 150 determines whether or not a user made an instruction, via the UI unit 160, indicating that collection setting information is to be entered for another collector 140.

Figure 10:
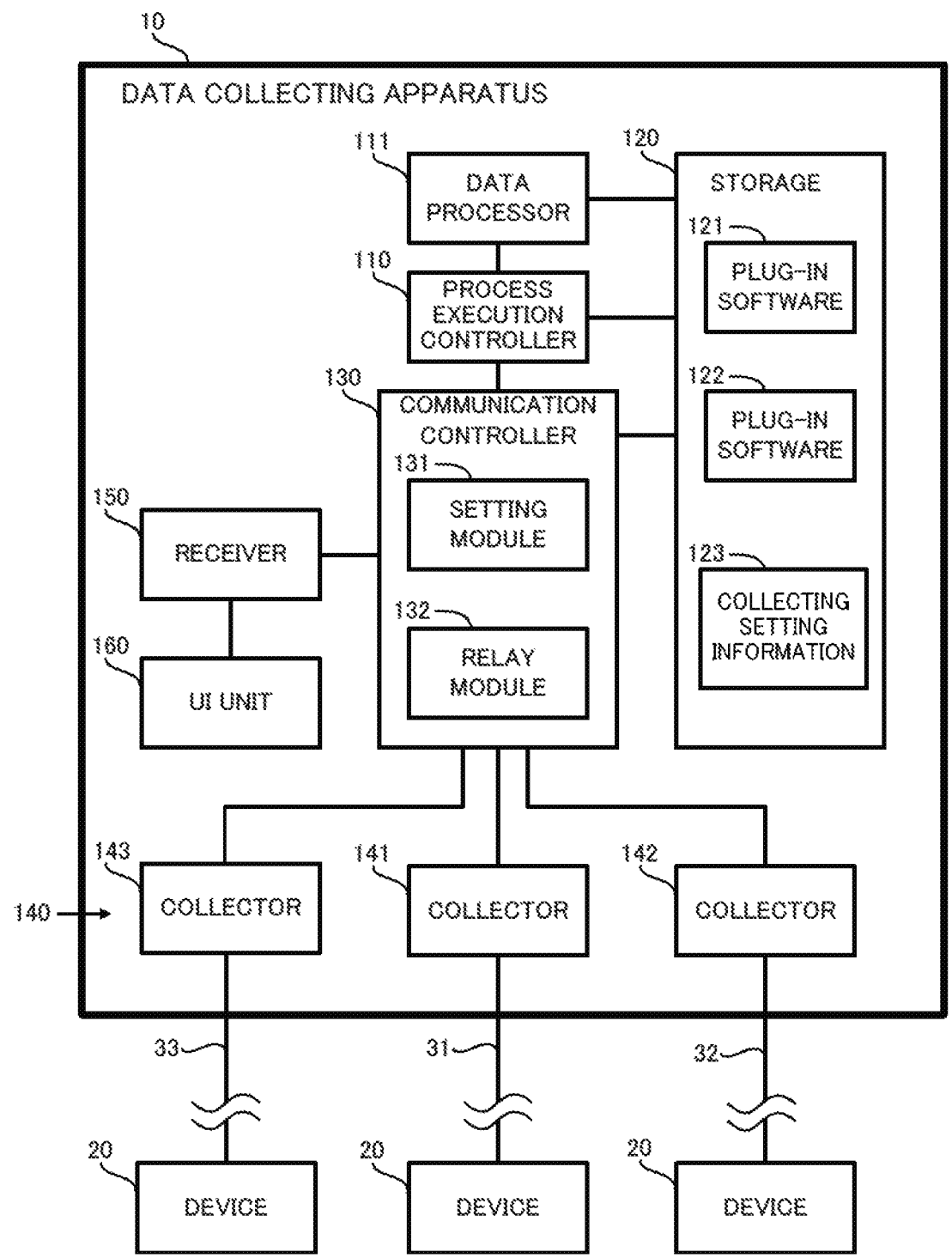
FIG. 10 is a diagram illustrating a state in which setting processing is complete and collection setting information is stored in a storage.

In a case in which a determination is made that no other collector 140 is to be set (NO in step S22), the data collecting apparatus 10 ends the setting processing. Conversely, in a case in which a determination is made that another collector 140 is to be set (YES in step S22), processing is repeated from step S15. In doing so, the collection setting information is input for each collector 140. Also, at step S21, the collection setting information is added to the storage 120. In doing so, collection setting information 123 is stored into the storage 120, as illustrated in FIG. 10.

The collection setting information 123 is a data table in which the identification number of the collector, the communication standard of the network through which data is collected, the collection target, and the collection time interval are associated with one another, as illustrated in FIG. 11. The identification numbers in FIG. 11 are the same as the reference numbers of collectors 141 to 143. The collection targets "device addresses A1 and A2" that are associated with the identification number "141" indicate that data transmitted from devices of addresses A1 and A2, among the devices connected to the first network 31, is collected. The data transmitted from other devices that are connected to the first network 31 is disposed of by the collector 141. Also, the collection target "sensor output" that is associated with the identification number "142", indicates the collecting of data indicating an outputting from a sensor by identifying the type of data based on the header information or attribute value of the packet data. Also, the collection target "operation state of a robot" that is associated with the identification number "143" indicates the collecting of data indicating the operation state of a robot by identifying the type of data.

The collection setting information 123 is not limited to the example illustrated in FIG. 11. The data may be freely selected. For example, the collection setting information 123 is not limited to four items that are in association with each other as illustrated in FIG. 11. The collection setting information 123 may be information in which five or more items are in association with one another. Alternatively, the items illustrated in FIG. 11 may be excluded from the collection setting information 123 and the collection setting information 123 may instead be information in which three or less other items are associated with one another. Also, the items illustrated in FIG. 11 may be modified to different items.

Figure 12:
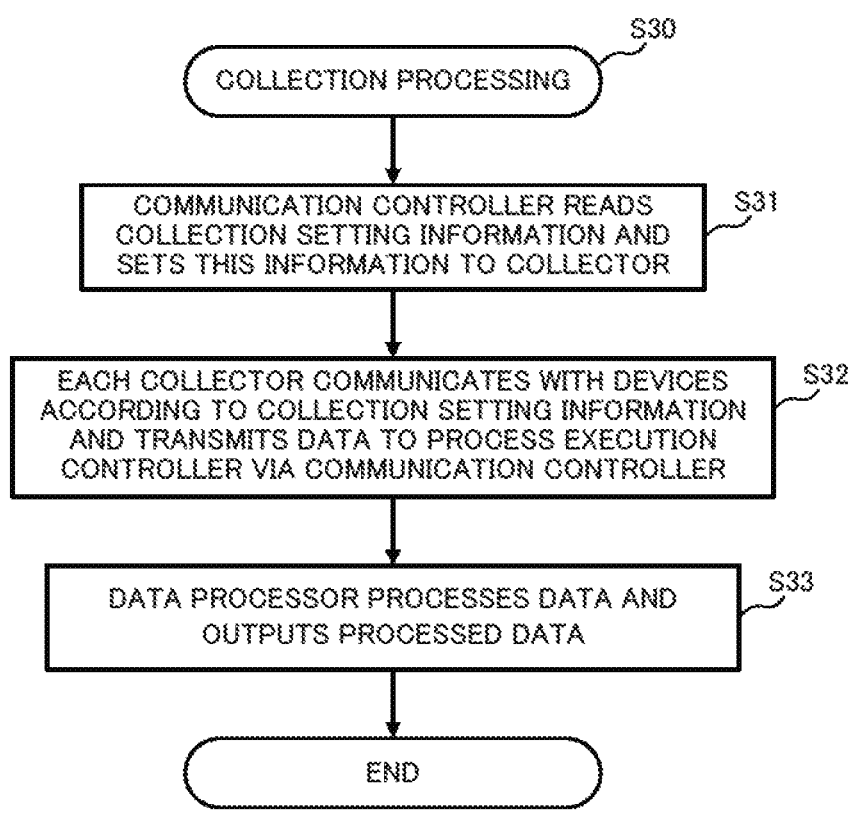
FIG. 12 is a flowchart of collection processing that is included in the data collection processing of FIG. 4.

Referring back to FIG. 4, after the setting processing (step S10) ends, the data collecting apparatus 10 starts the collection processing (step S30). In the collection processing, as illustrated in FIG. 12, the communication controller 130 reads the collection setting information from the storage 120, and also provides and sets each collector 140 with the read collection setting information (step S31).

Next, each collector 140 receives data by communicating with a corresponding device via the network in accordance with the set collection setting information, and transmits the received data to the process execution controller 110 via the communication controller 130 (step S32). Specifically, the communication controller 130 outputs the data collected by the collector 140 to the process execution controller 110. Then, the process execution controller 110 determines the processing of the collected data, and the data processor 111 processes the data collected, and outputs the processed data (step S33). After doing so, the collection processing ends.

The collection of data by each collector 140 may be performed by requesting the corresponding device 20 to transmit data, or may be performed by receiving data transmitted by the corresponding device 20 to the network regardless of whether or not there is a request.

As described above, the data collecting apparatus 10 displays an input screen for inputting collection setting information. In doing so, a user of the data collecting apparatus 10 can input information necessary for the collection of data while viewing the input screen. This, in turn, simplifies the setting task for collecting data.

Also, the data collecting apparatus 10 includes a collector 140 as a driver that supports various networks, a process execution controller 110 for the processing of data in real-time, and a communication controller 130 that functions as an interface between the collector 140 and the process execution controller 110. Therefore, the acquisition of data transmitted in the network and data processing can be smoothly joined together.

Also, the data collecting apparatus 10 stores the plug-in software 121 and 122 for causing the processor 11 to function as the collector 140. Therefore, data can be easily collected from a new network by executing the plug-in software 121 and 122. Furthermore, since the plug-in software 121 and 122 are rewritable, a user of the data collecting apparatus 10 can freely design the operation of the collection 140 as needed. Thus, the data collecting apparatus 10 can simplify the setting task for collecting data.

Moreover, the data collecting apparatus 10 includes the receiver 150 that outputs screen information and receives information inputted by the user. Therefore, the user can freely input collection setting information.

Furthermore, the data collecting apparatus 10 includes the UI unit 160 and the collector 140 outputs screen configuration information indicating a configuration of a screen to be displayed on the UI unit 160. Therefore, the provider of the collector 140 can freely create an input screen that relies on a specific data collection mode, without the provider of the collector 140 notifying a person in charge of management of a factory. Here, the provider of the collector 140 may be a manufacturer or a user of the data collecting apparatus 10, or may be a developer who develops the plug-in software 121 and 122.

Although embodiments of the present disclosure are described above, the present disclosure is not limited to the aforementioned embodiments.

Figure 13:
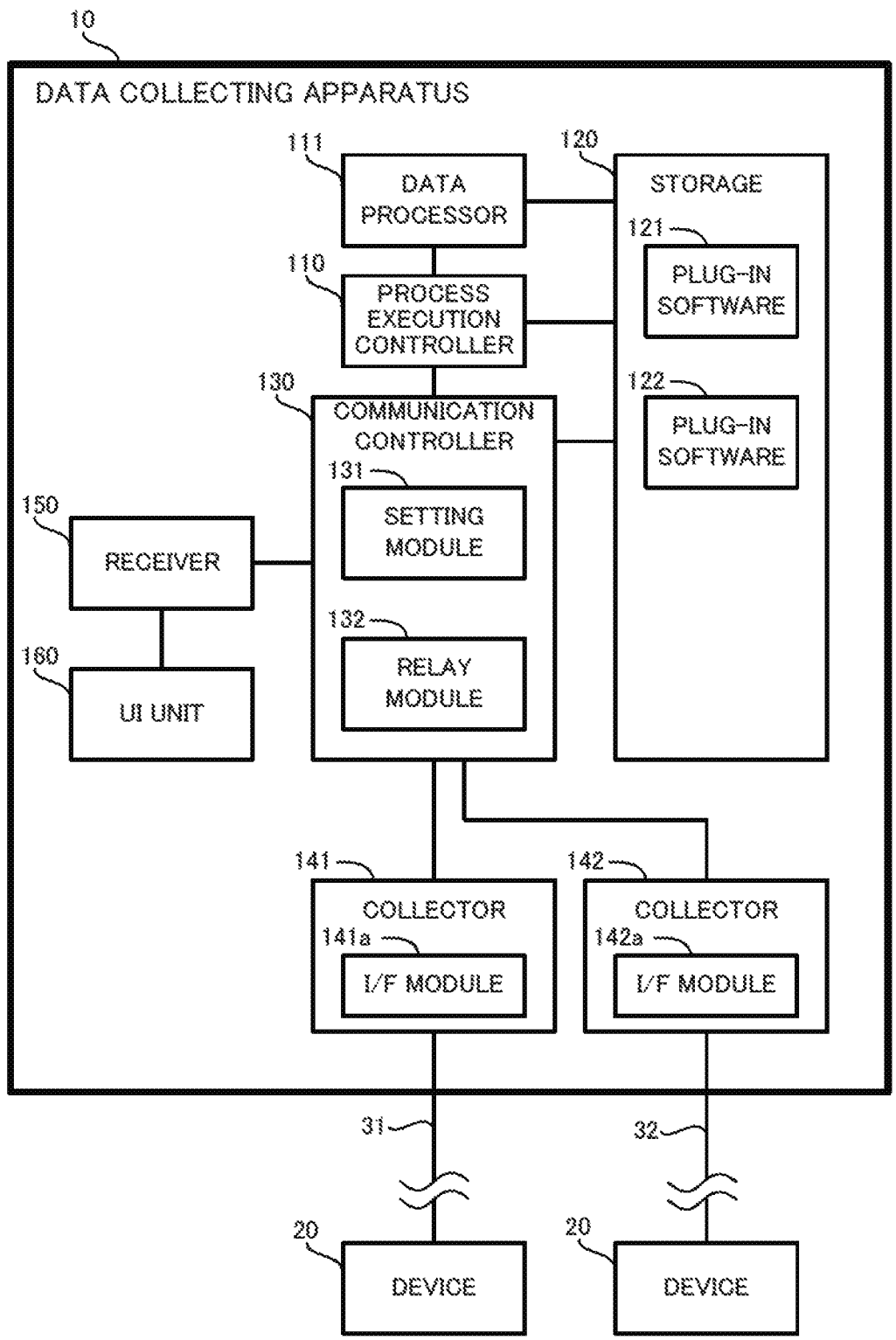
FIG. 13 is a diagram illustrating a modified example in which the collector includes an I/F module.

For example, in the aforementioned embodiments, the communication controller 130 acquires screen configuration information as setting support information from the collector 140. However, this is not restrictive. For example, as illustrated in FIG. 13, the collector 141 may have an I/F module 141a and the collector 142 may have a I/F module 142a, the I/F modules 141a and 142a both being for outputting setting support information. In response to a request from the communication controller 130, the I/F modules 141a and 142a output model information as setting support information to the communication controller 130. Then, the receiver 150 generates screen information by using the model information notified by the communication controller 130, and outputs the screen information to the UI unit 160.

The model information, for example, is a set that includes a name, address, type information (words, bits, character strings, and other information), and an attribute (reading/writing). Here, the term "address" refers to an address of data that is stored in the device 20. For example, in a case in which a storage region of temperature information in a device 20 starts from a "200" address, the collector 140 can acquire temperature information as data by specifying addresses from "200" and beyond with respect to the device 20. However, since a user is required to attain proficiency in data collection in order to determine an attribute of data by designating an address by a numerical value, the setting task might be complicated for inexperienced users. Therefore, if setting support information is handled using the format of a model by utilizing model information and associating a name to the address, even an inexperienced user can be expected to easily execute data collection.

Also, in a case in which the collectors 140 include one of the I/F modules 141a and 142a, the provider of the collector 140 can easily provide model information by various modes. For example, a file in which model information is defined in advance may be read by the collector 140 to generate model information. Also, the model information may be acquired for each device 20 of the devices 20 that are connected to the data collecting apparatus 10 via a network. The user can easily specify (set) data to be collected by selecting the model that the collector 140 supports.

Figure 14:
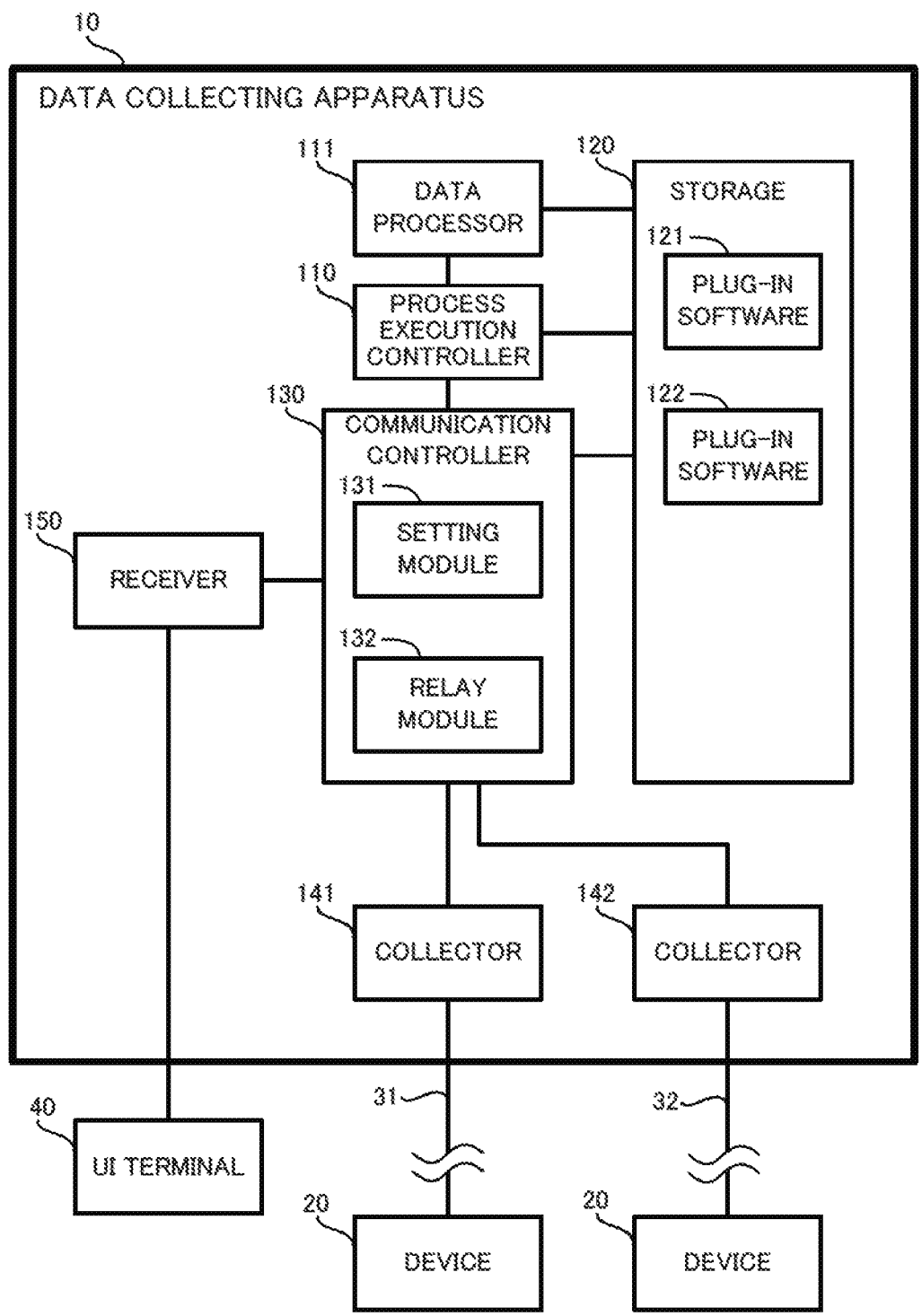
FIG. 14 is a diagram illustrating a modified example in which a receiver is connected to an external UI terminal.

Also, although the data collecting apparatus 10 includes the UI unit 160, this is not restrictive. For example, as illustrated in FIG. 14, the UI unit 160 may be excluded from the configuration of the data collecting apparatus 10, and the receiver 150 may output screen information to a UI terminal 40 that is connected to the data collecting apparatus 10 via a dedicated line or a network and may acquire collection setting information from the UI terminal 40. In such a case, the inputter 14 and the outputter 15 may be omitted from the hardware configuration of the data collecting apparatus 10.

Also, in the aforementioned embodiments, the number of networks to which the data collecting apparatus 10 is connected is two or three but this is not restrictive. The number of networks may be one or more than three.

In the aforementioned embodiments, the collector 141 is realized by executing the plug-in software 121 and the collector 142 is realized by executing the plug-in software 122 but this is not restrictive. For example, the collector 141 and the collector 142 can be realized by executing the plug-in software 121 twice. Alternatively, the collectors 141 and 142 may be realized by executing new plug-in software obtained or created by the user of the data collecting apparatus 10.

Also, the process execution controller 110, the communication controller 130, and the receiver 150 may be realized by executing a single program or may be realized by executing different programs.

Figure 15:
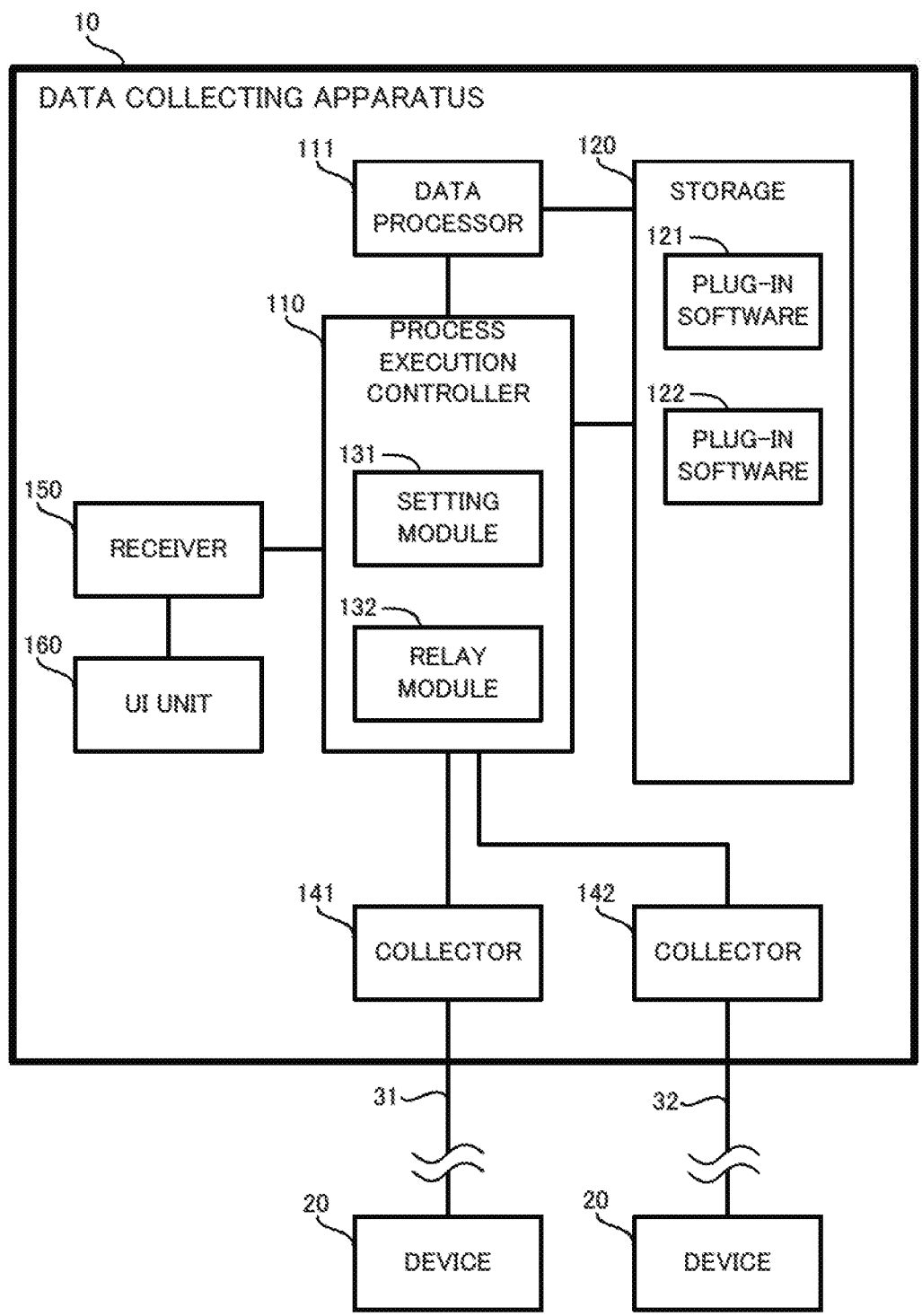
FIG. 15 is a diagram illustrating a modified example in which a process execution controller and a communication controller are integrated together.

Also, as illustrated in FIG. 15, the communication controller 130 may be excluded from the configuration of the data collecting apparatus 10, and the process execution controller 110 may be configured to achieve the functions of the communication controller 130.

Also, regarding the parameter setting items, FIG. 9 illustrates addresses of the devices that are to be collected as parameter setting items of the devices and illustrates a collection time interval as a parameter setting item of the network. Neither the parameter setting items of the devices nor the parameter setting item of the network are restricted to the examples given in FIG. 9. These items may be freely established. Also, the parameter setting items do not need to be established for both the devices and the network. The parameter setting items may be established for only the devices or for only the network. It is sufficient as long as parameter setting items are established for either the devices or the network. For example, in the example illustrated in FIG. 9, since the data transmitted by all of devices belonging to the network is collected at the same time interval, the collection time interval corresponds to the parameter setting item of the network, but the collection time interval may be set on a per-device basis.

Also, the functions of the data collecting apparatus 10 can be achieved by dedicated hardware or a general computer system.

For example, the device for executing the aforementioned processing can be realized by storing the program P1 that is executed by the processor 11 onto a computer-readable recording medium, by distributing the program P1, and by installing the program P1 stored in the recording medium onto the computer.

Furthermore, the program P1 may be stored on a disk device included of a server device on a communication network such as the Internet, to enable the program to be downloaded to the computer, for example by superimposing the program onto a carrier wave.

Further, the aforementioned processing can be achieved by starting and running the program P1 while transferring the program P1 via the communication network.

Moreover, the aforementioned processing can be achieved by executing all or part of the program P1 on the server device, and executing the program while transmitting and receiving of the information relating to such processing through the communication network by the computer.

Moreover, if the aforementioned functions are executed by sharing the functions between an operating system (OS) and application programs, or are executed by both the OS and the application programs in cooperation with each other, the non-OS portion along may be stored in the aforementioned medium and distributed, or alternatively, may be, for example, downloaded to the computer.

In addition, the means for achieving the functions of the data collecting apparatus 10 may be realized not just through software, but entirely or partially through dedicated hardware that includes a circuit.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for the collection of data.

REFERENCE SIGNS LIST

10 Data collecting apparatus
11 Processor
12 Main storage
13 Auxiliary storage
14 Inputter
15 Outputter
16 Communicator
17 Internal bus
20 Device
31 First network
32 Second network
33 Third network
40 UI terminal
110 Process execution controller
111 Data processor
120 Storage
121, 122 Plug-in software
123 Collection setting information
130 Communication controller
131 Setting module
132 Relay module
140 to 143 Collector
141*a*, 142*a* I/F module
150 Receiver
160 UI unit
P1 Program

The invention claimed is:

1. A data collecting apparatus to be connected to a device via a network, the data collecting apparatus comprising:
a processor programmed to perform as a collector configured to collect data from the device via the network based on collection setting information, convert a format of the data collected, and output the collected data whose format is converted;
communication control circuitry configured to manage an addition of the collector, provide the collection setting information to the collector, and output the data collected by the collector;
process execution control circuitry configured to manage processing of the data outputted by the communication control circuitry; and
receiving circuitry configured to receive an input of the collection setting information by outputting screen information indicating an input screen for inputting of the collection setting information,
wherein
the collector is further programmed to perform plug-in software containing setting support information including a parameter setting item for when data is collected from the device and provide the setting support information to the receiving circuitry,
the receiving circuitry receives the collection setting information that is set by a user adding in the input screen a setting value with respect to the parameter setting item, and notifies the communication control circuitry of the collection setting information, and the collection setting information includes information regarding the network to which the device is connected.

2. The data collecting apparatus according to claim 1 to be connected to the network and another network, wherein the receiving circuitry acquires the setting support information of one collector selected by a user from among the collector and another collector implemented by the processor and configured to collect data transmitted in the another network, generates the screen information from the setting support information acquired, and outputs the screen information generated.

3. The data collecting apparatus according to claim 2, wherein the setting support information is screen configuration information indicating a configuration of the input screen.

4. The data collecting apparatus according to claim 1, wherein the communication control circuitry is configured to manage addition of a second plug-in software to obtain another collector implemented by the processor and configured to collect second data based on second collection setting information from a second device that is connected to a second network, when second data from the second device connected to the second network is required to be collected.

5. The data collecting apparatus according to claim 1, wherein the collection setting information includes an identification of collection target data, the collection target data being configured to indicate a device that transmits the data to be collected, a type of the data to be collected, a time at which the data is to be collected, and a range of values of the data that is to be collected.

6. A data collecting method to be executed by a data collecting apparatus that is connected to a device via a network, the method comprising:

collecting, by a processor programmed to perform as a collector, data from the device via the network based on collection setting information;

converting a format of the collected data;

outputting the collected data whose format is converted;

managing, by a communication control circuitry, an addition to the collector of plug-in software containing setting support information including a parameter setting item for when data is collected from the device and outputting the data collected by the collector;

providing the collection setting information from the communication control circuitry to the collector;

managing, by process execution control circuitry, processing of the data outputted from the communication control circuitry; and receiving an input of the collection setting information by outputting screen information indicating an input screen for inputting of the collection setting information, wherein the receiving includes receiving the collection setting information that is set by a user adding in the input screen the setting value with respect to the parameter setting item, and the collection setting information includes information regarding the network to which the device is connected.

7. The data collecting method according to claim 6 to be executed by the data collecting apparatus that is connected to the network and another network, the method further comprising:

acquiring the setting support information of a first collector configured to collect data and selected by a user from among a plurality of available collectors configured to collect data and a second collector configured to collect data transmitted in the another network and selected by the user from among the plurality of available collectors;

generating the screen information from the setting support information acquired; and outputting the screen information generated.

8. A non-transitory computer-readable recording medium storing a program, the program causing a computer connected to a device via a network to perform steps including:

collecting, by a processor programmed to perform as a collector, data from the device via the network based on collection setting information;

converting a format of the data collected;

outputting the collected data whose format is converted;

managing an addition to the collector of plug-in software containing setting support information including a parameter setting item for when data is collected from the device and outputting the data collected by the collector;

providing the collection setting information to the collector;

managing processing of the outputted data collected by the collector; and receiving an input of the collection setting information by outputting screen information indicating an input screen for inputting of the collection setting information, wherein the receiving includes receiving the collection setting information that is set by a user adding in the input screen the setting value with respect to the parameter setting item, and the collection setting information includes information regarding the network to which the device is connected.

9. The non-transitory computer-readable recording medium according to claim 8, the program causing the computer connected to the network and another network to further perform steps of:

acquiring the setting support information of a first collector configured to collect data and selected by a user from among a plurality of available collectors configured to collect data and a second collector configured to collect data transmitted in the another network and selected by the user from among the plurality of available collectors;

generating the screen information from the setting support information acquired; and outputting the screen information generated.

* * * * *